(No Model.) 3 Sheets—Sheet 1.
L. LASH.
FEEDER FOR ROLLER MILLS.
No. 440,920. Patented Nov. 18, 1890.
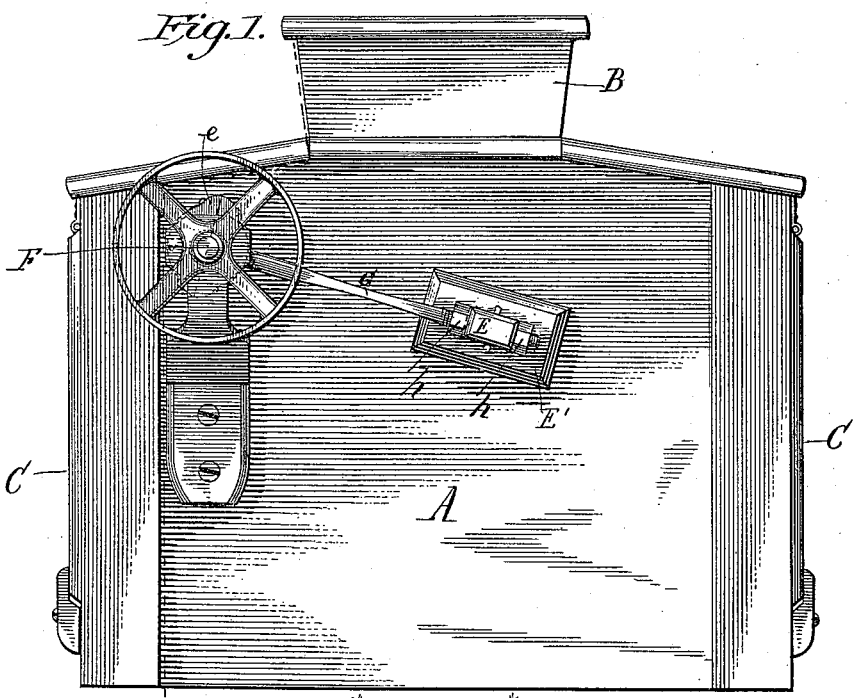
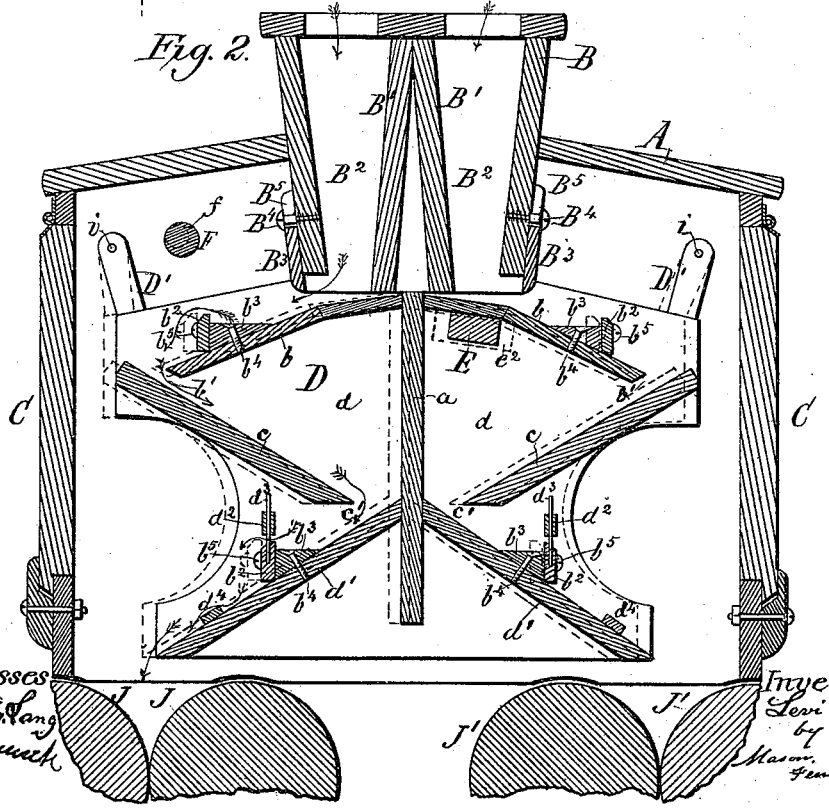

(No Model.) 3 Sheets—Sheet 2.

L. LASH.
FEEDER FOR ROLLER MILLS.

No. 440,920. Patented Nov. 18, 1890.

Witnesses
J. P. Theo. Lang
C. J. Fenwick

Inventor
Levi Lash
by his Attys
Mason, Fenwick & Lawrence (No Model.) 3 Sheets—Sheet 3.

L. LASH.
FEEDER FOR ROLLER MILLS.

No. 440,920. Patented Nov. 18, 1890.

Witnesses:
J. P. Theo. Lang.
E. J. Fenwick

Inventor:
Levi Lash
by his Atty
Mason, Fenwick & Lawrence

UNITED STATES PATENT OFFICE.

LEVI LASH, OF WAVERLY, MISSOURI.

FEEDER FOR ROLLER-MILLS.

SPECIFICATION forming part of Letters Patent No. 440,920, dated November 18, 1890.

Application filed July 16, 1890. Serial No. 358,997. (No model.)

*To all whom it may concern:*

Be it known that I, LEVI LASH, a citizen of the United States, residing at Waverly, in the county of La Fayette and State of Missouri, have invented certain new and useful Improvements in Feeders for Roller-Mills; and I do hereby declare the following to be a full, clear, and exact description of the invention, such as will enable others skilled in the art to which it appertains to make and use the same.

My invention relates to automatic feeders for roller-mills; and the object of the same is to provide a feeder with appliances for regulating the feed, whereby grain and the different products therefrom can be uniformly fed to the rolls without further attention than the adjustment of the gates and stops to adapt the feeder to the capacity of the different sets of rolls of a mill and to the nature of the stock fed through the hopper to the rolls. In the management of mills it is found, with many of the feeders in use, that where they are adapted for successfully feeding grain before it is cracked they become ineffective for feeding the different grades or reductions from such grain, and frequently the feeders become clogged and require much attention to render them operative; but with my invention I have found that all of the various reductions of grain can be flowed from the hopper to the rolls without any such difficulty being experienced, and the whole operation of feeding, after the necessary adjustments have been made, is automatic; and besides this all of the structural parts with which the grain or stock comes in contact can be made of wood or other material which does not impart any impurities to the grain or stock.

My invention consists in certain novel constructions, combinations, and arrangements of parts in a feeder for a roller-mill, whereby the above-mentioned objects are attained and difficulties overcome, as will be hereinafter described and claimed.

Figure 3:
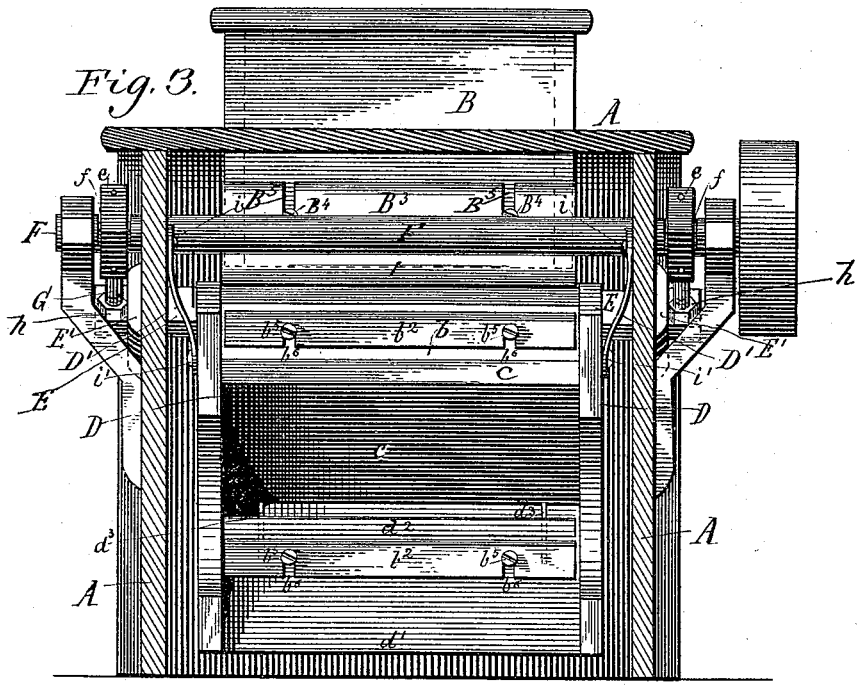
Figure 4:
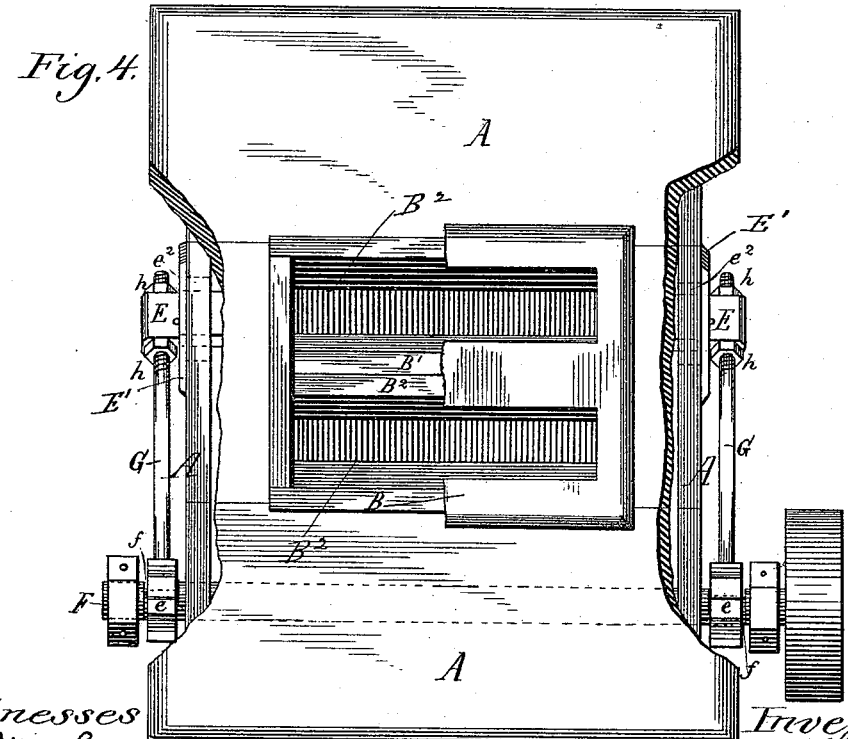
Figure 5:
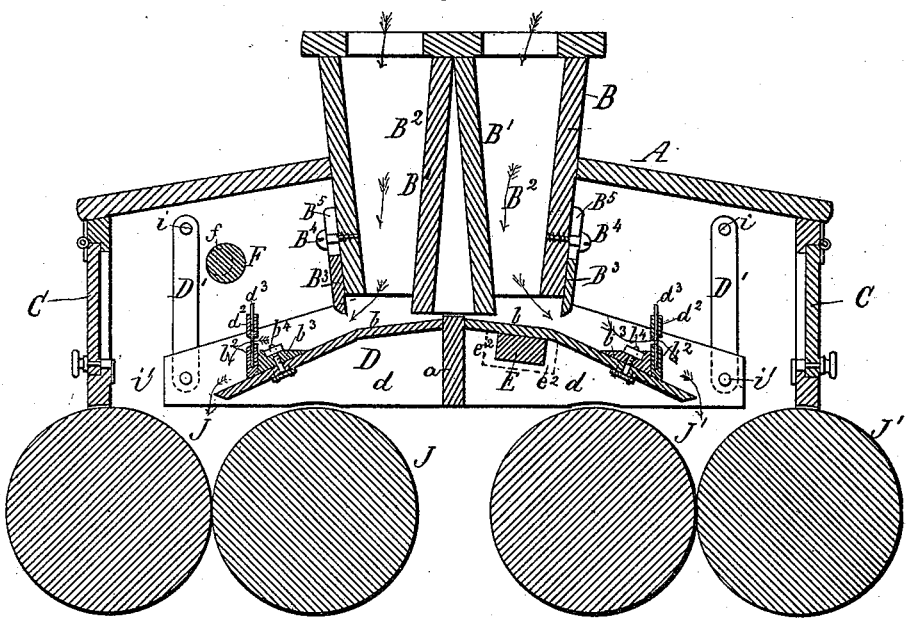
Figure 6:
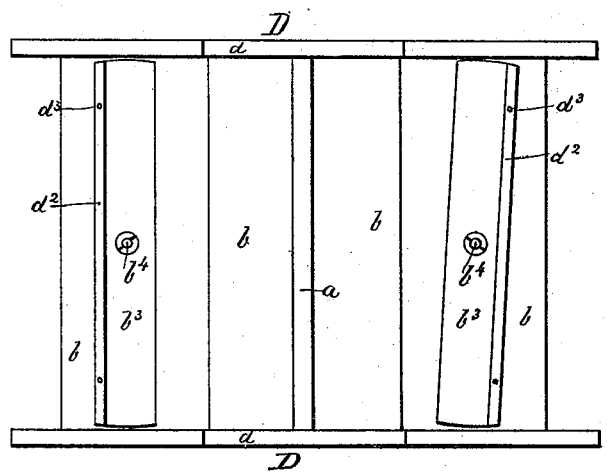

In the accompanying drawings, Figure 1 is a side elevation of my improved feeder for roller-mills; Fig. 2, a vertical central section of the same as applied in relation to two pair of rolls. Fig. 3 is a vertical section at right angles to Fig. 3 in a line just forward of the driving-shaft. Fig. 4 is a top view with portions broken away. Fig. 5 is a section similar to Fig. 2, showing a modification of the feeder. Fig. 6 is a detail plan view of the feeder proper.

A in the drawings indicates a casing having a double-throated hopper B applied in its top and having front and rear hinged inspection-doors C. This casing is open at its bottom, and is intended to be suspended slightly above grinding-rollers, as J J'. The throats $B^2 B^2$ are separated from one another by means of partition-boards B' B' or by a solid wedge-shaped partition, as may be found most desirable. At the bottom of the hopper, on the outside of each throat, adjustable gate-boards $B^3$ are applied, being secured in position by set-screws $B^4$, passed through slots $B^5$ in the boards and into the walls of the hopper.

D is a feeder proper suspended within the case A on pivots $i$, by means of rigid straps D', pivoted to the feeder at $i'$. This feeder is constructed of two end boards $d$, a vertical central board $a$, extending from end board to end board, angular inclined boards $b$, inclined boards $d' d'$, and reversely-inclined boards $c$, as shown. The boards $b$, $c$, and $d'$ on each side of the partition $a$ have passages $b'$ and $c'$ between them for the flow of grain or "stock" from the hopper-throats to the grinding-rolls. The amount of feed passing from the throats of the hopper upon the boards $b$ at a given time can be increased or decreased by raising or lowering the gates $B^3$. The transverse widths of the throats of the hopper and of the boards $b$ $c$ $d'$ are equal and also about the same as the length of the grinding-surfaces of the rolls J J'. Near the lower ends of the boards $b$, transverse arresting-ledges $b^2$ are applied to transverse ridge bars or blocks $b^3$, which are pivoted at $b^4$ to the boards $b$, as shown in Figs. 1 and 6. The ledges $b^2$ are connected to the ridge bars or blocks by set-screws $b^5$, which pass through vertical slots $b^6$ of the ledges and into the blocks. By means of the set-screws and slots the ledges can be set higher or lower, as desired, and thus retard the flow of the grain or stock to a greater or less extent over the ends of the boards $b$ upon the boards $c$. By pivoting the ridge bars or blocks $b^3$, they can be set from the right angular position shown on the left-hand side of Fig. 6 to the oblique position shown on the right-hand side of said figure, and thus if the grain should be fed through the throats of the hopper more on one side than on the other its tendency to flow in such condition to the rolls J J' can be avoided and an even distribution produced, the oblique set of the ridge bars or blocks $b^3$ and ledges $b^2$ thereon tending to direct the flow in that direction where the sheet of grain is the thinnest, and thus making the feed equitable. A similar arresting-ledge is placed on the boards $d'$ $d'$, being attached to similar ridge bars or blocks $b^3$, which are pivoted at $b^4$ to said boards, the ledges and ridge bars or blocks being adjustable in the same manner and for the same purpose as the ledges and ridge bars or blocks on the boards $b$. These latter ledges and ridge bars or blocks are placed about midway of the boards $d'$ $d'$. Above the ledges of the boards $d'$ other arresting-bars $d^2$ are applied on upright pins $d^3$, there being a feed-space between these bars and the ledges. Near the ends of the board $d'$ shallow arresting-ridges $d^4$ are applied, as shown. The feeder constructed as described is best adapted for the reductions from the grain. The best form for the ridge bars or blocks is that of a triangle in cross-section, as this form enables the grain or stock to glide upwardly more readily toward the ledges.

The best form for the feeder of grain itself is a single inclined board $b$ or a pair of such boards, as shown in Fig. 5, and in such form the bars $d^2$ and pins $d^3$ may or may not be used, and simply the ledges $b^2$, attached to the blocks $b^3$, as shown in Fig. 2, employed.

E E is a transverse bar fastened to the feeder D on one side of the partition $a$ and extended through slots (having a slight inclination from the horizon) formed in the side walls of the casing A. The ends of this bar are fitted firmly in slightly-inclined sliding bearings E', which cover the openings $e^2$ in the sides of the casing, and guiding and steadying the conductor or chute in its longitudinal vibrations.

F is the driving-shaft, and G are slightly-yielding eccentric-rods connected by eccentric boxes $e$ to the shaft and by means of screws and nuts at $h$ to the bar E, as illustrated in the drawings. By means of the screw-and-nut connection $h$ the throw of the feeder can be nicely adjusted and all looseness and rattling avoided, and by means of the guiding and steadying slides and rigid hangers the feeder is always kept in the same longitudinal path during its vibrations, and by making the rods G capable of yielding to a slight extent they will accommodate the throw of the eccentric, which, say, is about one-eighth of an inch, while the movement of the feeder is kept practically horizontal, as illustrated by the dotted lines in Fig. 2.

It is very desirable that the feeder shall have simply a back-and-forward movement on its hangers G G, and that said movement shall be always in the same longitudinal path and as nearly horizontal as possible and a positive one instead of one of simply a springy character. This is necessary, inasmuch as the stock or grain being fed to the rollers requires to be kept in a broad sheet of about a uniform depth or thickness and to be flowed gently over the transverse ledge in about the same manner as water flows over a dam.

In the operation of the feeder the grain passes through the throats of the hoppers upon the board $b$ and is temporarily arrested by the ledges $b^2$, and thereby caused to spread laterally in opposite directions, and then is forced in thin sheets over said ledges onto the boards $c$, from whence it passes onto the boards $d'$, and is again temporarily arrested by the ledges $b^2$ on said boards and caused to spread laterally in opposite direction and then to pass over the ledges onto the boards $d'$, and to be again temporarily arrested and spread by the ridges $d^4$, and then to pass over said ridges onto said board, and from thence to the grinding-rolls J J'. During said passage of the grain or stock the eccentrics $f$ of shaft F cause the rods E to vibrate the feeder and give it a gentle jarring movement in nearly a straight line, sufficient to keep the grain or stock in constant motion. In cases where the reductions of the grain are light or clammy and where the feed is too rapid for the capacity of the rolls the auxiliary bars $d^2$ may be adopted and the ledges $b^2$ and gates $B^3$ of the feeder adjusted in accordance with the demands of the case.

In the employment of my invention in a roller-mill I adopt, preferably, for feeding unbroken grain to the rolls a feeder such as is represented in Fig. 5 without the bars $d^2$ and pins $d^3$, and for feeding the broken substances or different reductions of the grain a feeder such as is represented in Fig. 2; but in all of its forms the feeder will operate on the same principle, only being changed with respect to the extent of its conducting-surface and number of arresting contrivances across said surface.

What I claim as my invention is—

1. The combination, with a feed-hopper and rolls of a roller-mill, of a vibrating conductor or shoe having a shelf provided with an attached arresting distributing-ledge, said ledge being vertically adjustable on a transverse bar or block extending across the shelf and located intermediate of the upper and lower ends of the shelf, substantially as described.

2. The combination, with the rolls of a roller-mill, of a vibrating shoe or conductor having an inclined upper shelf and an arresting-ledge connected to a transverse bar or block extending across the shelf intermediate of the upper and lower ends of said shelf, and which is made adjustable up and down toward or from the shelf, and a lower shelf having an arresting-ledge connected to a transverse bar or block also extending across the shelf intermediate of the upper and lower edges of said shelf and also made adjustable up and down, and an intermediate reversely-inclined shelf located relatively to the hopper and rollers, substantially as described.

3. In combination with the rolls of a roller-mill and a hopper, a conductor or shoe having one or more inclined shelves or boards provided, respectively, with one or more arresting-ledges, which are connected to beveled transverse bars or blocks applied to the shelves or boards between the upper and lower ends of the shelves and made adjustable by means of vertical slots and nearly horizontal screws, substantially as described.

4. In combination with the rolls of a roller-mill and a hopper, an outer case, a vibrating conductor or shoe having an inclined shelf, and a vertically-adjustable ledge connected to the vertical edge of a transverse supporting ridge bar or block, extending across and attached to the bottom of the inclined shelf of the shoe or conductor intermediate of the upper and lower ends of said inclined shelf, substantially as described.

5. In a feeder for roller-mills, in combination, rollers, a hopper, and a vibrating shoe or conductor provided with a transverse ledge-holding bar or block, and a ledge intermediate of its upper and lower ends, and said bar or block and ledge extending across the bottom of the shoe or conductor and the bar being pivoted centrally in said shoe or conductor, whereby said bar and ledge may be set at an angle to the front end of the shoe or conductor, the inclination being either to the right or left, as required, substantially as described.

6. In a feeder for roller-mills, the vibrating shoe or conductor provided with a transverse adjustable ledge and a holder for the ledge, which is pivoted centrally in said shoe, whereby the said ledge may be set at an angle to the front of said shoe, substantially as described.

7. In a feeder for a roller-mill, the vibrating shoe or conductor provided with a transverse ledge-holding bar or block, and a transverse ledge having slots between its upper and lower edges and connected by means of screws passed horizontally, or nearly so, through said slots to the holder and made vertically adjustable on said holder, the said ledge and holder being located intermediate of the upper and lower edges of an inclined shelf of said shoe or conductor, and said shoe with the ledge being arranged between the supply-hopper and rolls of a roller-mill, substantially as described.

8. In combination with the rolls of a roller-mill, an outer case, a suspended vibrating conductor or shoe having reversely-inclined transverse shelves or boards connected to a central vertical partition and which are arranged beneath the hopper having a double throat, vertically-adjustable gates at the bottom of the throats of the hopper, rigid suspenders, slightly-yielding connecting-rods, transverse vibrating shaker-bar, sliding plates for guiding and steadying the conductor or shoe, said plates being attached to said shaker-bar and covering the openings in the sides of said case in which said bar moves, and a driving-shaft having eccentrics formed or applied on it and fitting in eccentric boxes of the connecting-rod, substantially as described.

9. In combination with the rolls of a roller-mill, an outer case, vibrating conductor or shoe having inclined transverse shelves or boards beneath and on one side of the throat of a hopper, vertically-adjustable temporarily-arresting and distributing ledges applied on one or more of said shelves, rigid suspenders, yielding connecting-rods, a transverse shaker-bar, sliding, steadying, and guiding plates on said bar covering the openings in said case in which said bar moves, and a driving-shaft having eccentrics fitting in eccentric boxes of the connecting-rod, substantially as described.

10. The combination, with the rolls of a roller-mill, of an outer case, a vibrating conductor or shoe having a top inclined shelf or board, a bottom inclined shelf or board, and a reversely-inclined intermediate shelf or board, vertically-adjustable ledges on two of the said shelves, rigid suspenders, slightly-yielding connecting-rods, a transverse vibrating shaker-bar, sliding, steadying, and guiding plates attached to said shaker-bar and covering the openings in which said bar moves, and a driving-shaft having eccentrics fitting in eccentric boxes of the connecting-rod, substantially as described.

11. In combination with the rolls of roller-mill, an outer inclosing-case, a hopper, a vertically-adjustable gate at the bottom of said hopper, an inclined shelf, which has applied to it a temporarily-arresting and distributing ledge, which is adjustable vertically on its support away from and toward the shelf, rigid suspenders, slightly-yielding connecting-rods, a transverse shaker-bar passed through the sides of said case, means for steadying, guiding, and preventing lateral vibration of the shoe or conductor attached to the bar, and a driving-shaft having eccentrics on both ends, substantially as described.

12. In combination with the rolls of a roller-mill, a conductor or shoe provided with a primary arresting-ledge, which is made adjustable up and down, and an auxiliary stop-bar set a slight distance above the primary arresting-ledge and connected to the same, substantially as described.

13. In combination with a hopper and the rolls of a roller-mill, a nearly horizontally-vibrating grain or stock conductor or shoe provided with means for preventing lateral vibration and having an inclined shelf provided with a temporarily-arresting and distributing ledge, which is connected to a transverse bar extended across the shoe and located intermediate the upper and lower ends of said shelf, on which bar the said ledge is adjustable toward and from the shelf, means for suspending the said conductor, and a flexible connecting-rod connected to a driving-shaft, having an eccentric near each of its ends for producing the necessary vibratory movement, substantially as described.

14. The combination, with the rolls of a roller-mill, of the vibrating grain conductor or shoe D, having reversely-inclined shelves provided with a main temporarily-arresting and distributing vertically-adjustable ledge on its lower shelf, a stop-bar, and a fixed auxiliary ridge arranged forward of the adjustable ledge and made shallower than the same, substantially as described.

15. In combination with rolls of a roller-mill, a shoe or conductor adapted to spread the stock or grain on its passage from the hopper to the rolls in a thin broad sheet and flow the same over between the rolls from end to end, rigid hangers for suspending said shoe or conductor, a transverse bar rigidly connected to said shoe and having its ends extended through slots in the inclosing-case, guiding, steadying, and sliding plates covering the slots in which said bar vibrates, connecting-rods which are adjustable in length and are made flexible between their ends, a driving-shaft, and eccentric connections between the shaft and connecting-rods, substantially as described.

In testimony whereof I hereunto affix my signature in presence of two witnesses.

LEVI LASH.

Witnesses:
EDWARD T. FENWICK,
W. H. BARNES.